(12) United States Patent
Logan et al.

(10) Patent No.: US 8,577,547 B2
(45) Date of Patent: Nov. 5, 2013

(54) FUEL CELL VEHICLE PERFORMANCE MODE

(75) Inventors: Victor W. Logan, Naples, NY (US); David A. Masten, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1351 days.

(21) Appl. No.: 11/851,219

(22) Filed: Sep. 6, 2007

(65) Prior Publication Data

US 2009/0069975 A1 Mar. 12, 2009

(51) Int. Cl.
*G06F 7/00* (2006.01)
(52) U.S. Cl.
USPC .............................. 701/36; 429/900; 903/903
(58) Field of Classification Search
USPC ................. 429/13, 452, 900; 701/22, 36; 180/65.21; 903/903
See application file for complete search history.

(56) References Cited

U.S. PATENT DOCUMENTS

| | | | |
|---|---|---|---|
| 2002/0022161 A1* | 2/2002 | Kurosaki et al. | 429/13 |
| 2002/0064695 A1* | 5/2002 | Raiser | 429/13 |
| 2004/0168449 A1* | 9/2004 | Homan et al. | 62/134 |
| 2006/0063048 A1* | 3/2006 | Kolodziej | 429/24 |
| 2006/0102397 A1* | 5/2006 | Buck et al. | 180/65.3 |
| 2007/0088483 A1* | 4/2007 | Yoshida | 701/69 |
| 2007/0275279 A1* | 11/2007 | Hwang et al. | 429/23 |

* cited by examiner

*Primary Examiner* — Helal A Algahaim
(74) *Attorney, Agent, or Firm* — John A. Miller; Miller IP Group, PLC

(57) ABSTRACT

A system and method for putting a fuel cell vehicle into a performance mode by preloading sub-systems in the fuel cell system so that high power is available from the fuel cell stack quicker than during normal fuel cell system operation. For example, if a driver activates a vehicle performance mode, the fuel cell system can respond by, for example, increasing the compressor speed, increasing anode recirculation, increasing air and cooling fluid flow through the radiator, increasing battery state-of-charge, etc. Thus, when the driver requests the high power after the system is in the performance mode, the system is able to deliver the desired power immediately or at least quicker and for a longer time period.

13 Claims, 2 Drawing Sheets

FUEL CELL VEHICLE PERFORMANCE MODE

BACKGROUND OF THE INVENTION

1. Field of the Invention

This invention relates generally to a method for putting a fuel cell system on a vehicle in a performance mode and, more particularly, to a method for preloading certain vehicle sub-systems in a fuel cell system so as to increase vehicle performance when high power is requested.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

For certain vehicle operation, it is desirable that the vehicle provide high performance by minimizing the throttle response time, i.e., the time from when the vehicle operator requests power from the fuel cell stack to when the fuel cell stack is able to deliver the power. As is well understood in the art, there is a certain lag between when power is requested from the fuel cell stack in a fuel cell system until when the fuel cell stack is able to deliver the power. For example, the compressor that provides the cathode air to the cathode side of the fuel cell stack is limited in its ability to immediately provide enough air when high power is commanded from the fuel cell stack. Not only is there an inherent lag time while the compressor spools up to the desired speed, the power from the fuel cell stack is also selectively distributed between the traction system of the vehicle and the compressor to provide the cathode air. Therefore, it may be desirable to incorporate techniques for increasing fuel cell vehicle performance in response to a high power request.

SUMMARY OF THE INVENTION

In accordance with the teachings of the present invention, a system and method are disclosed for putting a fuel cell vehicle into a performance mode by preloading sub-systems in the fuel cell system so that high power is available from the fuel cell stack quicker than during normal fuel cell system operation. For example, if a driver activates a vehicle performance mode, the fuel cell system can respond by, for example, increasing the compressor speed, increasing anode recirculation, increasing air and cooling fluid flow through the radiator, increasing battery state-of-charge, etc. Thus, when the driver requests the high power after the system is in the performance mode, the system is able to deliver the desired power immediately or at least quicker and for a longer period of time.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for increasing fuel cell vehicle performance by preloading various vehicle sub-systems is merely exemplary in nature, and is in no way intended to limit the invention or its applications or uses.

Figure 1:
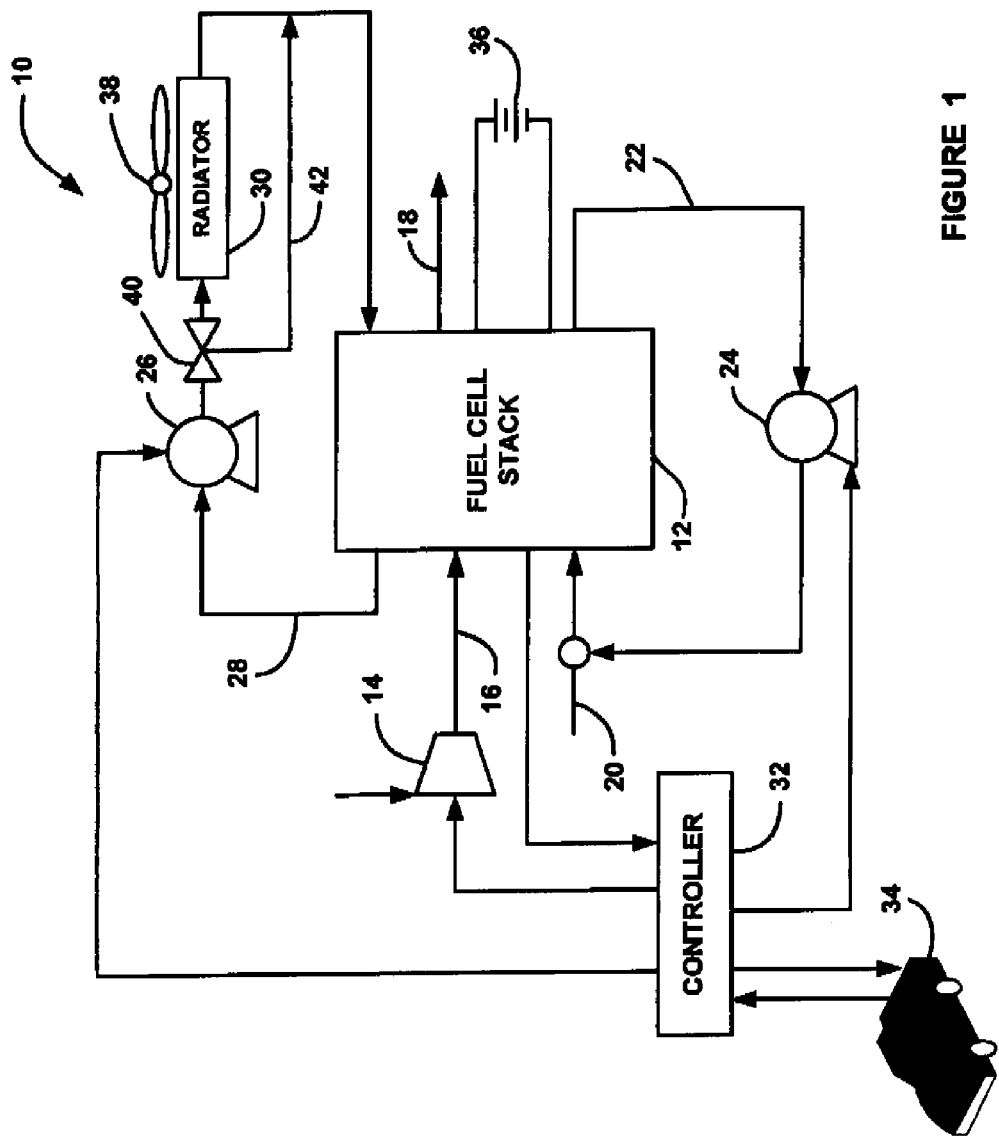
FIG. 1 is a schematic plan view of a fuel cell system.

FIG. 1 is a schematic plan view of a fuel cell system 10 including a fuel cell stack 12. Cathode air is provided to the cathode side of the fuel cell stack 12 from a compressor 14 on a cathode input line 16. Cathode exhaust gas is output from the stack 12 on a cathode exhaust gas line 18. Fuel, typically hydrogen gas, is provided to the anode side of the fuel cell stack 12 on an anode input line 20. In this non-limiting example, the anode exhaust gas is sent through a recirculation loop 22 that includes a pump 24 for pumping the anode exhaust gas back to the anode input line 20 so that unused hydrogen can be recycled. Other types of fuel cell systems can benefit from the invention, as described below, that do not include an anode recirculation loop, such as a fuel cell system including separate sub-stacks employing anode flow shifting.

A pump 26 pumps a cooling fluid through a cooling fluid loop 28 outside of the stack 12 and cooling fluid flow channels in bipolar plates within the fuel cell stack 12. A radiator 30 is provided in the cooling fluid loop 28 to reduce the temperature of the cooling fluid before it is sent back to the fuel cell stack 12. A fan 38 drives air through the radiator 30 to provide the cooling. A by-pass valve 40 in the loop 28 can be controlled to allow a selective amount of the cooling fluid to by-pass the radiator 30 on a by-pass line 42 to control the temperature of the cooling fluid. A battery 36 is electrically coupled to the fuel cell stack 12, and provides supplemental power to operate the system 10, as is well understood in the art. The battery 36 can be recharged by the fuel cell stack 12. A controller 32 controls the speed of the compressor 14 and the pumps 24 and 26 using algorithms for desired fuel cell system operation based on many parameters, including a power request from a vehicle operator, to provide the desired output power from the fuel cell stack 12 in a manner that is well understood to those skilled in the art. The controller 32 also arbitrates the split of stack power to the compressor 14 and the vehicle traction system.

As will be discussed in detail below, the present invention proposes a system and method for increasing a fuel cell vehicle's performance by pre-loading vehicle sub-systems to minimize throttle response. The controller 32 will receive a request from a certain input command, such as a performance selector switch on the dashboard of the vehicle, application of the brake and throttle simultaneously, etc., in anticipation of an impending request by the driver for high power and a fast throttle response. FIG. 1 shows a vehicle 34 that provides a signal to the controller 32 from, for example, a switch on the dashboard of the vehicle 34, to put the system 10 in the performance mode. The controller 32 takes proactive actions to ensure that the fuel cell system 10 can deliver full power immediately, or nearly immediately, following the request. The controller 32 puts the fuel cell system 10 into a full-power ready mode. The full-power ready mode commands a balance of plant sub-systems to supply all necessary full power reactants while maintaining the current desired power, which is typically a lower value including net zero.

Figure 2:
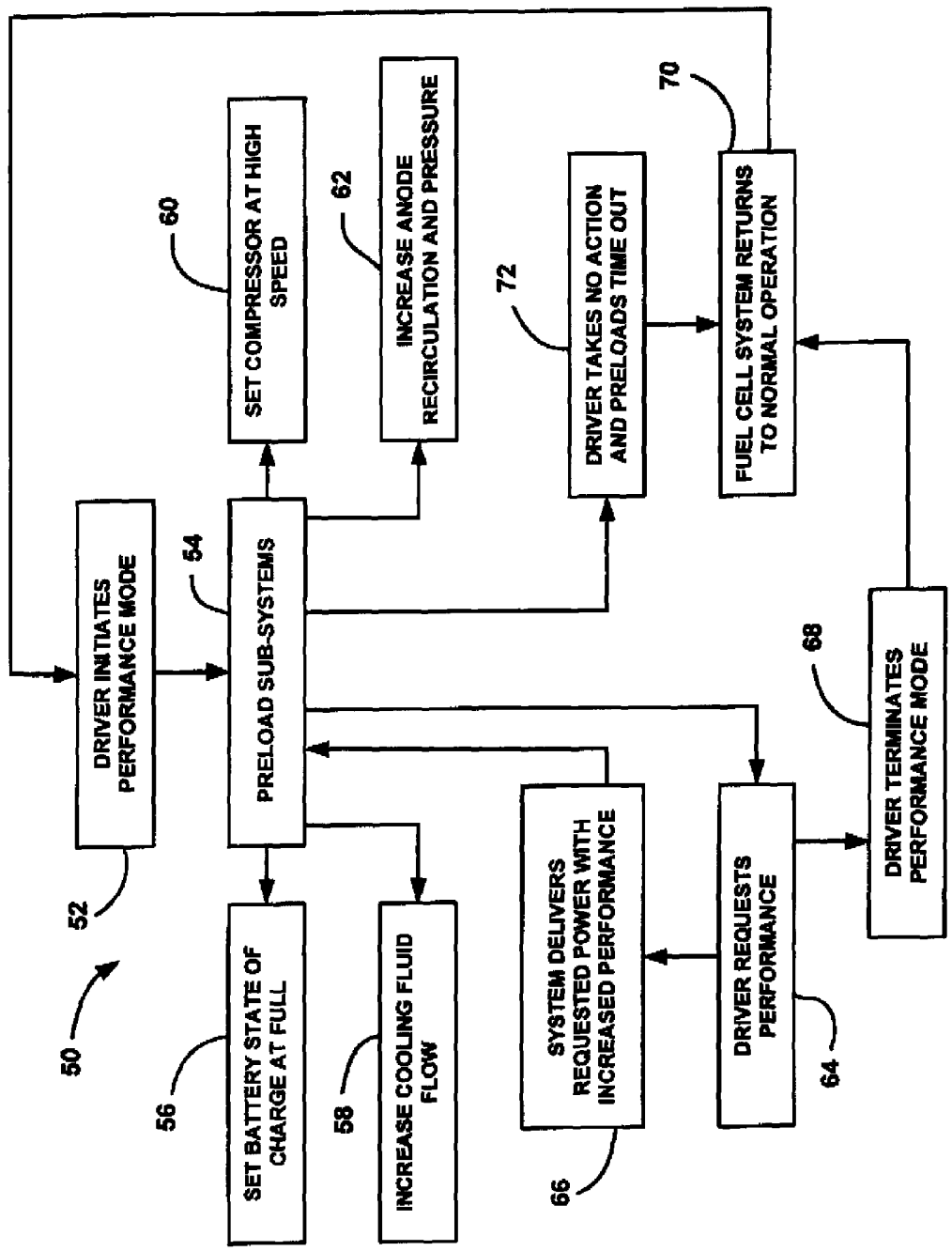
FIG. 2 is a flow chart diagram showing a process for preloading fuel cell vehicle sub-systems in anticipation of a driver high performance request, according an embodiment of the present invention.

FIG. 2 is a flow chart diagram 50 showing a process for providing a driver initiated performance mode and system response thereto in a fuel cell vehicle. The driver initiates the performance mode at box 52, which can be in any suitable manner as discussed above, such as a switch on the dashboard, when he or she anticipates that he or she will want full stack power immediately in the near future. The performance mode initiation is received by the controller 32, which acts to preload various fuel cell sub-systems at box 54. At this point, the driver has not requested the high performance by applying heavy acceleration, but anticipates that he or she may do so in the near future.

The preloading of the sub-systems includes setting the compressor 14 to a high speed at box 60. In certain fuel cell systems, it takes a substantial amount of power for a substantial amount of time to increase the cathode compressor 14 to full speed. The power used to increase the compressor speed is selectively provided from the output of the stack 12 and the battery 36. Therefore, by increasing the speed of the compressor 14 to full or near full speed for the performance mode, the compressor speed will already be in the proper position to provide full airflow to the stack 12 when full power is requested.

During the time that the performance mode is initiated and when the performance is requested, the cathode air that is not needed by the fuel cell stack 12 can be sent to a by-pass line through a by-pass valve (not shown) that by-passes the fuel cell stack 12. For those systems that may not have a cathode inlet air by-pass line, there may be a time limit as to how long the compressor speed can be maintained high when forcing air through the stack 12 while water is not being generated that may act to dry out the membranes in the stack 12.

The controller 32 may also manage the anode in a way that favors performance over efficiency at box 62. Particularly, in anticipation of a high power request, the controller 32 may increase the speed of the pump 24 to provide better fuel distribution to the anode side of the fuel cell stack 12. Further, if the compressor speed is raised, it may be desirable to increase the anode pressure in the anode side of the stack 12 so that the higher partial pressure of fuel may provide better performance.

The battery 36 provides supplemental power in association with the fuel cell stack 12 to power the traction system of the vehicle. Typically, it is desirable to maintain the battery state-of-charge (SOC) between a desired maximum value and a minimum value to maintain the battery life and provide other efficiencies. Algorithms are known in the art that control the charge and discharge of the battery 36 to maintain the battery's state of charge within the desired range. In the system 10, the battery state-of-charge can be maintained at its maximum capacity at box 56 in anticipation that battery power will be needed to satisfy the performance request from the driver. Typically the algorithms that maintain the battery state-of-charge attempt to do so in an efficient manner where the least amount of system resources is used. However, for the performance mode, efficiency may be sacrificed for performance.

Additionally, the controller 32 may manage the thermal sub-system to increase the thermal buffer of the fuel cell system 10, which may include the use of the radiator fan 38 and reducing the temperature of the radiator 30 prior to a full power request. Thus, the radiator 30 will have a greater ability to absorb heat when the high power is requested, and the power limits of the stack 12 will be less likely to be limited because of high heat for an extended period of time.

After the driver initiates the performance mode at the box 52 and the controller 32 preloads the sub-systems at the box 54, the driver may request the increased performance at box 64. As discussed above, the system 10 will be ready to immediately provide the desired performance by being able to immediately provide full power from the stack 12. The system 10 delivers the requested power with increased performance at box 66 where the system 10 will maintain the sub-systems preloaded, as discussed above. Alternatively, the driver can terminate the performance mode at box 68, at which time the controller 32 will cause the fuel cell system 10 will go back to its normal operation at box 70 where the sub-systems are not preloaded, and better system efficiency is provided. The process the goes back to the box 52 to wait for the performance request.

If the driver initiates the performance mode at the box 52, but does not make a performance request at the box 64 for a predetermined period of time, the system may time out at box 72, at which time it will return to normal fuel cell system operation at the box 70.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for initiating a performance mode of a fuel cell system in a vehicle, said performance mode causing a fuel cell stack in the fuel cell system to deliver power quicker than during normal fuel cell system operation, said method comprising:
providing a command that puts the vehicle in the performance mode;
preloading a plurality of vehicle sub-systems that act to reduce the time it takes the fuel cell stack to provide a predetermined high power; and
providing a performance request where the fuel cell stack does deliver the high power in response to the command that puts the vehicle in the performance mode.

2. The method according to claim 1 wherein preloading the vehicle sub-systems includes setting a cathode compressor to a high speed.

3. The method according to claim 1 wherein preloading the vehicle sub-systems includes increasing the fuel pressure of an anode side of the fuel cell stack.

4. The method according to claim 3 wherein preloading the vehicle sub-systems includes increasing an anode exhaust recirculation to the fuel cell stack.

5. The method according to claim 1 wherein preloading the vehicle sub-systems includes setting a battery state-of-charge to a predetermined maximum.

6. The method according to claim 1 wherein preloading the vehicle sub-systems includes increasing radiator fan flow to increase the thermal buffer of the fuel cell system.

7. The method according to claim 1 further comprising removing the preloading of the vehicle sub-systems after a predetermined period of time has expired if the performance request is not made.

8. The method according to claim 1 wherein providing a command that puts the vehicle in the performance mode includes switching a switch.

9. The method according to claim 1 wherein providing a command that puts the vehicle in the performance mode includes simultaneously applying throttle and braking of the vehicle.

10. A method for initiating a performance mode of a fuel cell system in a vehicle, said performance mode causing a fuel cell stack in the fuel cell system to deliver power quicker than during normal fuel cell system operation, said method comprising:

providing a command that puts the vehicle in the performance mode;

preloading a plurality of vehicle sub-systems that operate to reduce the time it takes the fuel cell stack to provide a predetermined high power, said preloading of the vehicle sub-systems including setting a cathode compressor to a high speed, increasing the fuel pressure of an anode side of the fuel cell stack, setting a battery state-of-charge to a predetermined maximum and increasing radiator fan flow to increase the thermal buffer of the fuel cell system;

providing a performance request where the fuel cell stack does deliver the high power in response to the command that puts the vehicle in the performance mode; and removing the preloading of the vehicle sub-systems after a predetermined period of time has expired if the performance request is not made.

11. The method according to claim 10 wherein preloading the vehicle sub-systems includes increasing an anode exhaust recirculation to the fuel cell stack.

12. The method according to claim 10 wherein providing a command that puts the vehicle in the performance mode includes switching a switch.

13. The method according to claim 10 wherein providing a command that puts the vehicle in the performance mode includes simultaneously applying throttle and braking of the vehicle.

* * * * *